United States Patent

[11] 3,589,750

| [72] | Inventor | Paul G. Dunmire<br>Oakland, Calif. |
| --- | --- | --- |
| [21] | Appl. No. | 832,917 |
| [22] | Filed | June 13, 1969 |
| [45] | Patented | June 29, 1971 |
| [73] | Assignee | Christy Metal Products, Inc.<br>Emeryville, Calif. |

[54] PIPE COUPLING
2 Claims, 5 Drawing Figs.

| [52] | U.S. Cl. | 285/95, 285/344, 285/345, 285/363 |
| --- | --- | --- |
| [51] | Int. Cl. | F16l 17/02 |
| [50] | Field of Search | 285/95, 363, 414, 344, 345 |

[56] References Cited
UNITED STATES PATENTS

| 1,988,694 | 1/1935 | Mally | 285/344 |
| --- | --- | --- | --- |
| 2,329,000 | 9/1943 | Rembert | 285/344 X |

FOREIGN PATENTS

| 120,716 | 1/1931 | Austria | 285/344 |
| --- | --- | --- | --- |
| 1,511,294 | 12/1967 | France | 285/344 |
| 895,998 | 11/1953 | Germany | 285/344 |

*Primary Examiner*—Dave W. Arola
*Attorney*—Flehr, Hohbach, Test, Albritton & Herbert ABSTRACT: Flanged fluid coupling for interconnecting the open ends of a pair of pipe ends or other flow passages. Within the interior of each of two flanged fluid coupling halves, an O-ring is carried in a groove. Adjacent the sides of each groove, the bordering surfaces of the coupling confront the pipe periphery (those remote from the flanges being substantially parallel to the pipe periphery while the others taper increasingly radially away from the periphery in the direction of the flanges). Each of the O-rings is rolled onto its respective pipe end after its related coupling half has been placed on its end of the pipe. Then reverse movement of the coupling half rolls the O-ring into its associated groove. Bolts or other takeup means draw the two coupling halves together.

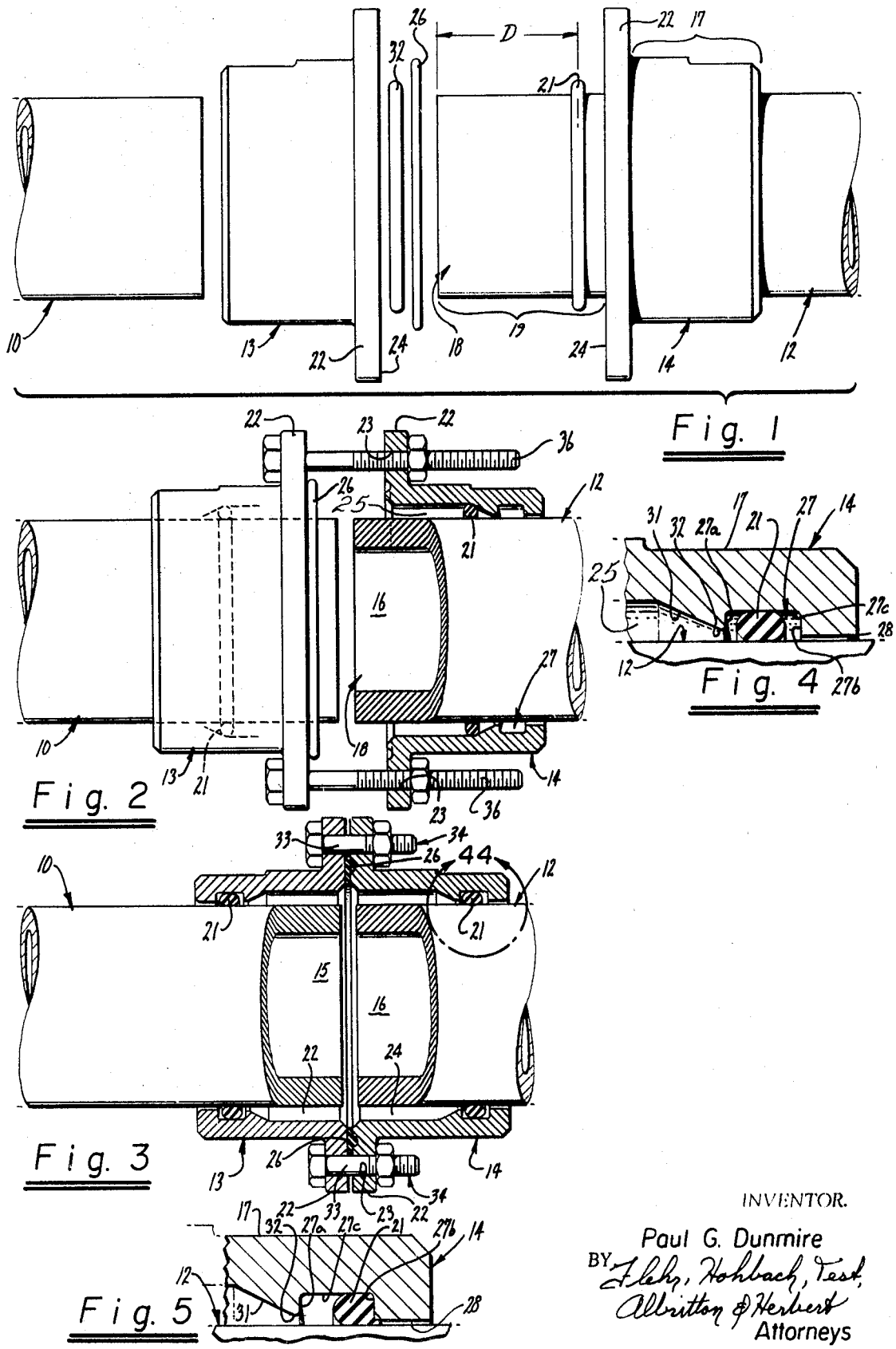

PIPE COUPLING

BACKGROUND OF THE INVENTION

This invention pertains to fluid couplings for connecting aligned flow passages and is particularly useful in forming a sealed connection between a pair of plain end pipe sections, i.e., pipe sections having a right cylindrical end portion of single exterior diameter throughout an extent sufficient to extend through an associated coupling "half."

Heretofore, as in typical waterline connections for coupling aligned flow passages having two confronting pipe ends, a common practice has been to specially prepare the pipe ends with a tapered exterior for insertion into a flanged coupling of a type formed with an interior groove encircling its flow passage. A resilient seal ring is then inserted into the groove. Then the tapered pipe end is thrust or drawn with considerable force into the associated "half" of the coupling. Thus, the pipe ends must be machined in advance as a separate step in preparing the coupling.

As thus arranged, in operation, fluid pressure from within the pipe section acts against the seal ring in a direction serving to drive the seal ring along the pipe backwardly through an annular clearance formed between the exterior of the pipe end and the interior of the encircling coupling "half."

Present style couplings can only be used for the initial installation of a pipe run as they are inapplicable where short pieces of plain end pipe are required in approaching a valve box, meter, or other immovable fitting, or where a short length of pipe must be interposed between a pair of stationary portions of the line, as where it is desired to "cut into" a previously laid line.

Also, the above style of coupling has been subject to loss of its seal under fluid pressure wherein the seals have been blown out of the coupling under line pressure.

OBJECTS

Accordingly, it is a general object of the present invention to provide an improved fluid coupling.

It is another object of the invention to provide an improved fluid coupling wherein the line pressure being sealed is employed to aid in forming the sealed relationship.

It is yet a further object of the invention to provide an improved fluid coupling wherein no prior tapering or special preparation need be made to the confronting ends of pipe sections prior to installing a coupling therebetween.

The foregoing objects of the invention will become more readily apparent from the following detailed description of the invention when considered in conjunction with the accompanying drawings and the following general summary.

SUMMARY OF THE INVENTION

In general, there is provided herein a coupling device of the type employed for making connection between aligned flow passages. Each half of the coupling structure is adapted to be carried about the periphery of a section of pipe or other annular elongated means forming one of the two aligned flow passages. Each half of the coupling includes an elongated hollow body portion formed with an interior providing sufficient clearance throughout the length of its body so that it can be first slidably moved onto the end of a pipe section to a position out of the way of the end, i.e., to a point where the end of the pipe section will protrude from the body portion so as to expose the pipe end to receive a resilient sealing ring, such as an O-ring.

Thus, after first placing the coupling half onto the end of the pipe and moving it to a position remote from the end, the sealing ring can be located in a proper position so that, subsequently, the coupling half can be returned toward the end of the pipe.

Within the interior of the coupling half a tapered surface serves to gradually and increasingly compress the sealing ring until the sealing ring passes into an annular groove or recess formed about the interior of the coupling half. The confronting sidewalls of the recess, or groove, each form an abrupt abutment facing the recess so as to retain the seal ring captured therebetween. The seal ring is pressed firmly to engage the pipe periphery to form a seal between the body interior and the pipe. This seal is then in a position subject to fluid line pressure. That wall of the groove which is remote from the open end of the associated pipe section extends into relatively closely spaced relation to the periphery of the pipe so as to provide minimal clearance with respect to the pipe periphery for retaining the seal ring against the fluid pressure. Flanges formed about the other end of each coupling structure provide a radially extending clamping face which serves to compress a seal ring disposed between pairs of complementary coupling halves of the above type and to seal the open end of the associated pipe sections even while pressure from the line continues to act against both seal rings.

BRIEF DESCRIPTION OF THE DRAWINGS.

FIG. 1 is an exploded side elevation view of components ready for assembly according to the invention;

FIG. 2 is a side elevation view, partially in section, showing a coupling according to the invention at an intermediate stage of assembly;

FIG. 3 is a side elevation view, partly in section, showing a fluid coupling according to the invention in its assembled condition; and FIGS. 4 and 5 are enlarged detail views of a portion of FIG. 3 taken along the line 4—4 thereof respectively showing successive stages of formation of a seal about a pipe section, according to the invention.

DETAILED DESCRIPTION OF PREFERRED EMBODIMENT

Having in mind the above general description of the invention as utilized, for example, in making a connection between the aligned flow passages of two sections of water pipe wherein the ends of the water pipes 10 and 12 are of the "plain end" style, a detailed description of the coupling proceeds as follows.

A pair of coupling structures 13, 14 hereinafter referred to as coupling halves or sections 13, 14 are adapted to be carried about the periphery of associated ends of pipes 10, 12 or other annular elongated means forming the respective aligned flow passages 15, 16 (FIG. 3).

For purposes of disclosure herein, the invention will be described in terms of a pair of aligned plain end pipe sections. Further, it will be readily apparent that, with the exceptions as noted herein, each of the two coupling halves 13, 14 is of identical construction and, accordingly, it is believed necessary to describe only one herein.

Coupling half 14 includes an elongated hollow body portion 17. The hollow interior or hole 15 of body portion 1 is dimensioned and adapted to provide radial clearance throughout the length of its interior between the interior surfaces of body portion 17 and the periphery or exterior of pipe 12. Thus, the coupling half 14 can be first moved slidably over the open end 18 of pipe 12 and moved to a position (as shown in FIG. 1) permitting the pipe portion 19 surrounding the open end 18 to protrude out of the coupling half 14 at the left (as shown).

The protruding end portion 19 is thus adapted to receive an annular resilient seal ring, such as the O-ring 21, rollably positioned thereon. O-ring 21 is disposed a measured distance D remote from the end of pipe 12 for purposes described further below.

Coupling half 14 includes an annular flange 22 formed with a number of bolt holes 23 and a planar clamping face 24 for pressing a seal ring 26 between each of the two confronting clamping faces 24.

The hole of the coupling half 14 is defined by a first annular surface 25 which has a diameter that is substantially greater than the diameter of the end of the pipe in which the coupling half is mounted. The hole is also defined by a second annular surface 28 which has a diameter which is only slightly larger than the diameter of the end of the pipe on which the coupling half is mounted. Recess 27 is characterized by confronting sidewalls 27a and 27b each of which forms an abrupt abutment surface facing the recess 27 so as to retain seal ring 21 therebetween. The radially outer surface 27c of recess 27 provides portions serving to compress seal 21 firmly into engagement with the periphery of pipe section 12 so as to form a seal between the coupling half 14 and pipe 12.

The abutment surface 27b extends radially inwardly toward the periphery of pipe section 12 sufficiently closely to provide a minimal clearance whereby seal ring 21, even though subject to fluid pressure from the open end 18 of flow passage 16, will be retained without risk of its being blown through the gap thus formed. Thus the, clearance is little more than a mere sliding fit between the periphery of pipe 12 and the interior of coupling half 14 at that axial position.

The hole in the body portion 17 is further defined by a radially inwardly tapering surface 31 disposed axially between first and second annular surfaces 25 and 28 and is oriented in a direction so as to progressively and increasingly compress seal 21 upon movement of body portion 17 toward the open end 18. This movement also serves to relatively advance seal ring 21 toward recess 27 until it becomes lodged therein.

Thus, it is apparent that an entry clearance or annular gap 32 must provide sufficient spacing between the interior of body portion 17 and the periphery of pipe section 12 to permit seal ring 21 to pass into recess 27 while at the same time leaving an abutment surface 27a to terminate at a sufficiently close radial position to pipe section 12 so as to retain ring 21 within recess 27 in the event that pipe section 12 should be moved longitudinally in a direction extending away from flange 22. As thus arranged, ring 21 remains captured within recess 27.

From the drawings it can be seen that the sidewalls of the recess 27 have a height which is at least as great as one-half of the corresponding dimension of the O-ring 21 when it is disposed within the recess and said second annular surface and the portion of the inclined annular surface 31 having the smallest diameter are spaced from the pipe section a distance which is less than one-half of the same corresponding dimension of the O-ring in the recess.

In order to assemble the coupling, and as mentioned above, each coupling half 13, 14 is first slipped over the end of an associated one of the two pipe sections 10, 12 and moved to a position axially remote from the open end of its associated section. Next a resilient seal ring, such as the O-ring 21, is slipped onto the exposed end of the pipe section and moved a predetermined measured distance D away from the end of the pipe.

Distance D serves to dispose seal ring 21 at a location axially along pipe section 12 so that by the time that ring 21 passes into its captured position within recess 27, the clamping faces 24 of the two flanges 22 will be each located substantially at the plane of the end of the pipes or slightly beyond. In this manner, the shanks 33 of the bolts 34 shall be substantially entirely protected that the working portion of each bolt 34 shall not be exposed to corrosive elements.

Means are provided for drawing the two coupling halves 13, 14 together so as to permit the placement of short bolts 34. Thus, as shown in FIG. 2, elongated bolts 36 may first be used in a few equiangularly located holes 23 of flanges 22 and evenly taken up so as to draw the tapered surface 31 toward the open end 18 of each pipe section 12, 13. In so doing, the O-rings 21 will roll along the right cylindrical portion of the plain end pipe section 12 until tapered surface 31 commences to compress the seal ring 21. Ultimately, seal ring 21 rolls through the entry clearance or gap 32 to be captured between the abutment walls 27a, 27b of recess 27.

Inasmuch as the surface 27c of the recess serves to press the resilient ring 21 radially inwardly toward pipe section 12, the characteristic rolling nature of O-ring 21 will be substantially lost so that further axial movement of O-ring 21 will require a skidding movement, if any. This change in the nature of O-ring 21 causes considerable resistance to any such movement and, to the extent that relative movement occurs thereafter between body portion 17 and O-ring 21, the latter will be deformed and "pinched" within the minimal clearance 28 defined between body portion 17 and pipe section 12. In the foregoing manner, a considerably fluidtight seal is formed and acts against the line pressure of fluid in pipe section 12.

The seal ring 26 clamped between the confronting clamping faces 24 of the two coupling halves 13, 14 serves to provide a second fluid seal which is also subject to line pressure from the open ends 18 of pipe sections 10, 12. From the foregoing, it will be readily apparent that there has been provided an improved fluid coupling which permits a coupling to be readily made without need for specially preparing the aligned pipe ends. It will also be apparent that fluid pressure in the line serves to help in forming the seal and that the working portions of flange bolts holding the two coupling halves together will be substantially protected against corrosive elements since no more than a minimum exposure of these working portions of the bolts ever becomes necessary in holding the coupling together.

It will be readily apparent that other types of flow passages, such as provided by a flanged portion of a valve, can be coupled to one of the coupling halves, such as coupling half 14 and form an adapter.

In certain circumstances, it may be desirable in order to prevent relative longitudinal movement between the pair of coupling halves 13, 14 and the region of the aligned flow passages to employ a so-called pipe-stop ring (not shown) between the two clamping faces 24. In this event, it may be necessary to employ a pair of seal rings of the type such as seal ring 26 and to form a groove or seat in each of the two confronting clamping faces 24.

I claim:

1. In a coupling assembly of the type to be utilized for making a connection between two adjacent open ends of cylindrical pipe sections with aligned flow passages for carrying a fluid, first and second coupling sections adapted to be slidably mounted on said two adjacent open ends of said pipe sections, each of said coupling sections comprising an elongate body having a hole extending therethrough said hole being defined by a first inner annular cylindrical surface having a diameter which is substantially greater than the diameter of the end of the pipe on which the coupling section is to be mounted and a second annular surface which has a diameter which is only slightly larger than the diameter of the end of the pipe on which the coupling section is to be mounted and an inclined annular surface joining said first and second annular surfaces said inclined annular surface forming an obtuse angle with said first annular surface, said body being formed with an annular recess which is generally U-shaped in cross section and which opens through said second annular surface defining said hole, said annular recess being defined by a pair of sidewalls which are substantially perpendicular to said second annular surface and a bottom wall which is generally parallel to said second annular surface, said body being adapted to be mounted on the pipe section so that the first annular surface forms an annular recess between the body and the end of the pipe which opens in the same direction as the flow passage in the pipe sections, an O-ring adapted to be mounted on the end of said pipe in a desired location so as to permit the body to be moved in a direction toward the end of the pipe section to roll over the O-ring and to permit it to move into the recess in said body and to thereby form a seal between the pipe section and the body, and means forming a sealing engagement between the first and second coupling sections after the bodies have been rolled over the O-rings to form a sealing engagement between the first and second coupling sections, said O-ring in each coupling section being positioned so that fluid pressure applied to the O-ring from the fluid passing through said pipe sections forces said O-ring in the recess in a direction toward one of the sidewalls of the recess, said sidewalls of the recess having a height which is at least as great as one-half of the corresponding dimension of the O-ring when it is disposed in the recess and said second annular surface and the portion of the inclined annular surface having the smallest diameter being spaced from the pipe section a distance which is less than one-half of the same corresponding dimension of the O-ring in the recess.

2. A coupling assembly as in claim 1 herein each of said bodies is provided with radially extending flanges and wherein said means connecting said first an second coupling sections includes bolt means extending through said flanges and a seal ring disposed between said flanges.